US008713947B2

(12) United States Patent
Draper et al.

(10) Patent No.: US 8,713,947 B2
(45) Date of Patent: May 6, 2014

(54) POWER PLANT WITH GAS SEPARATION SYSTEM

(75) Inventors: Samuel David Draper, Simpsonville, SC (US); Kenneth William Kohl, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 227 days.

(21) Appl. No.: 13/217,610

(22) Filed: Aug. 25, 2011

(65) Prior Publication Data

US 2012/0023957 A1  Feb. 2, 2012

(51) Int. Cl.
*F02C 1/08* (2006.01)
(52) U.S. Cl.
USPC ............. 60/783; 60/39.52; 60/772; 60/784
(58) Field of Classification Search
USPC ............ 60/39.52, 39.55, 772, 781, 783, 784
See application file for complete search history.

(56) References Cited

U.S. PATENT DOCUMENTS

| | | | |
|---|---|---|---|
| 2,621,475 A | 12/1952 | Loy | |
| 2,646,663 A | 7/1953 | Sedille | |
| 3,659,417 A * | 5/1972 | Grieb | 60/785 |
| 3,685,287 A | 8/1972 | Dooley | |
| 3,771,969 A | 11/1973 | Scheitlin | |
| 3,866,411 A | 2/1975 | Marion et al. | |
| 3,875,380 A | 4/1975 | Rankin | |
| 3,943,703 A * | 3/1976 | Kronogard | 60/791 |
| 3,949,548 A | 4/1976 | Lockwood, Jr. | |
| 4,267,692 A | 5/1981 | Earnest | |
| 4,271,664 A | 6/1981 | Earnest | |
| 4,313,300 A | 2/1982 | Wilkes et al. | |
| 4,330,038 A | 5/1982 | Soukup et al. | |
| 4,434,613 A | 3/1984 | Stahl | |
| 4,492,085 A | 1/1985 | Stahl et al. | |
| 4,528,811 A | 7/1985 | Stahl | |
| 4,530,207 A | 7/1985 | Brännström | |
| 4,533,314 A | 8/1985 | Herberling | |

(Continued)

FOREIGN PATENT DOCUMENTS

| | | |
|---|---|---|
| EP | 1731833 A1 | 12/2006 |
| EP | 2078827 A1 | 7/2009 |
| EP | 2206959 A2 | 7/2010 |

OTHER PUBLICATIONS

Bandar Duraya Al-Anazi, Enhanced Oil Recovery Techniques and Nitrogen Injection, Oct. 2007, CSEG Recorder, pp. 28-33.*

(Continued)

*Primary Examiner* — William H Rodriguez
*Assistant Examiner* — Lorne Meade
(74) *Attorney, Agent, or Firm* — Sutherland Asbill & Brennan LLP (57) ABSTRACT

A power plant arrangement and method of operation is provided. The power plant arrangement includes at least one main air compressor and at least one gas turbine assembly. Each assembly includes a turbine combustor for mixing a portion of compressed ambient gas with a portion of a recirculated low oxygen content gas flow and a fuel stream for burning to form the recirculated low oxygen content gas flow. A recirculation loop for recirculating at least a portion of the recirculated low oxygen content gas flow from the turbine to a turbine compressor is provided. At least one auxiliary apparatus is fluidly connected to the main air compressor and may be at least partially powered by the compressed ambient gas flow.

16 Claims, 4 Drawing Sheets

(56) References Cited

U.S. PATENT DOCUMENTS

| | | |
|---|---|---|
| 4,561,245 A | 12/1985 | Ball |
| 4,566,267 A | 1/1986 | Muller et al. |
| 4,622,808 A | 11/1986 | Kenison et al. |
| 4,766,721 A | 8/1988 | Iizuka et al. |
| 5,165,606 A | 11/1992 | Pelet |
| 5,341,636 A | 8/1994 | Paul |
| 5,361,576 A | 11/1994 | Muller |
| 5,400,587 A | 3/1995 | Keler et al. |
| 5,426,932 A | 6/1995 | Morihara et al. |
| 5,557,919 A | 9/1996 | Althaus |
| 5,564,896 A * | 10/1996 | Beeck et al. .............. 415/175 |
| 5,584,182 A | 12/1996 | Althaus et al. |
| 5,595,059 A | 1/1997 | Huber et al. |
| 5,674,066 A | 10/1997 | Hausermann et al. |
| 5,724,805 A | 3/1998 | Golomb et al. |
| 5,794,431 A | 8/1998 | Utamura et al. |
| 5,809,768 A | 9/1998 | Uematsu et al. |
| 5,822,992 A | 10/1998 | Dean |
| 6,050,082 A | 4/2000 | Leonard et al. |
| 6,082,093 A | 7/2000 | Greenwood et al. |
| 6,105,362 A | 8/2000 | Ohtomo |
| 6,202,400 B1 | 3/2001 | Utamura et al. |
| 6,256,976 B1 | 7/2001 | Kataoka et al. |
| 6,269,624 B1 | 8/2001 | Frutschi et al. |
| 6,289,666 B1 | 9/2001 | Ginter |
| 6,338,240 B1 | 1/2002 | Endo et al. |
| 6,363,709 B2 | 4/2002 | Kataoka et al. |
| 6,430,915 B1 | 8/2002 | Wiant et al. |
| 6,584,775 B1 | 7/2003 | Schneider et al. |
| 6,622,470 B2 | 9/2003 | Viteri et al. |
| 6,637,183 B2 | 10/2003 | Viteri et al. |
| 6,848,249 B2 | 2/2005 | Coleman et al. |
| 6,851,266 B2 | 2/2005 | Liebig |
| 6,868,677 B2 * | 3/2005 | Viteri et al. ............ 60/784 |
| 6,910,335 B2 * | 6/2005 | Viteri et al. ............ 60/786 |
| 7,007,487 B2 | 3/2006 | Belokon et al. |
| 7,032,388 B2 | 4/2006 | Healy |
| 7,089,743 B2 | 8/2006 | Frutschi et al. |
| 7,107,774 B2 * | 9/2006 | Radovich ............... 60/778 |
| 7,127,898 B2 | 10/2006 | Healy |
| 7,383,686 B2 | 6/2008 | Aycock et al. |
| 7,490,472 B2 | 2/2009 | Lynghjem et al. |
| 7,503,178 B2 | 3/2009 | Bücker et al. |
| 7,516,609 B2 | 4/2009 | Agnew |
| 7,726,114 B2 | 6/2010 | Evulet |
| 7,739,864 B2 | 6/2010 | Finkenrath et al. |
| 7,895,822 B2 | 3/2011 | Hoffmann et al. |
| 8,172,521 B2 | 5/2012 | Tillery et al. |
| 8,205,455 B2 * | 6/2012 | Popovic ................... 60/772 |
| 8,266,883 B2 * | 9/2012 | Dion Ouellet et al. ...... 60/39.52 |
| 2003/0051481 A1 | 3/2003 | Priestley et al. |
| 2003/0221409 A1 | 12/2003 | McGowan |
| 2004/0011057 A1 * | 1/2004 | Huber .................... 60/781 |
| 2004/0134194 A1 * | 7/2004 | Roby et al. ............. 60/750 |
| 2004/0200205 A1 | 10/2004 | Frutschi et al. |
| 2005/0028529 A1 | 2/2005 | Bartlett et al. |
| 2005/0076645 A1 | 4/2005 | Frutschi et al. |
| 2005/0150229 A1 | 7/2005 | Baer et al. |
| 2007/0006592 A1 * | 1/2007 | Balan et al. ............. 60/772 |
| 2007/0034171 A1 | 2/2007 | Griffin et al. |
| 2007/0068167 A1 | 3/2007 | Patel et al. |
| 2007/0125063 A1 | 6/2007 | Evulat |
| 2007/0125064 A1 | 6/2007 | Sonoda |
| 2007/0125091 A1 | 6/2007 | Roby et al. |
| 2007/0220896 A1 | 9/2007 | Varatharajan et al. |
| 2008/0010967 A1 | 1/2008 | Griffin et al. |
| 2008/0104938 A1 | 5/2008 | Finkenrath et al. |
| 2008/0104939 A1 * | 5/2008 | Hoffmann et al. .......... 290/52 |
| 2008/0120960 A1 | 5/2008 | Agnew |
| 2008/0309087 A1 | 12/2008 | Evulet et al. |
| 2009/0078587 A1 * | 3/2009 | Farber .................... 205/781 |
| 2009/0199566 A1 | 8/2009 | Lebas et al. |
| 2009/0218821 A1 | 9/2009 | Elkady et al. |
| 2009/0280003 A1 | 11/2009 | Schriner et al. |
| 2009/0284013 A1 * | 11/2009 | Anand et al. ............ 60/39.52 |
| 2009/0301054 A1 | 12/2009 | Simpson et al. |
| 2010/0018218 A1 | 1/2010 | Riley et al. |
| 2010/0115960 A1 | 5/2010 | Brautsch et al. |
| 2010/0126181 A1 | 5/2010 | Ranasinghe et al. |
| 2010/0170218 A1 * | 7/2010 | Eluripati et al. .......... 60/39.183 |
| 2010/0180565 A1 * | 7/2010 | Draper ................... 60/39.52 |
| 2011/0067408 A1 | 3/2011 | Maly |
| 2011/0138766 A1 | 6/2011 | Elkady et al. |
| 2011/0289898 A1 | 12/2011 | Hellat et al. |
| 2012/0023958 A1 * | 2/2012 | Snook et al. ............. 60/772 |

OTHER PUBLICATIONS

Disclosure under 37 CFR 1.56 U.S. Appl. No. 13/217,610, filed May 7, 2012.
Supplemental Disclosure under 37 CFR 1.56 for U.S. Appl. No. 13/217,610, filed Oct. 17, 2012.
Supplemental Disclosure under 37 CFR 1.56 for U.S. Appl. No. 13/217,610, filed Mar. 17, 2014.

* cited by examiner

POWER PLANT WITH GAS SEPARATION SYSTEM

BACKGROUND OF THE INVENTION

The subject matter of the present disclosure relates generally to the field of electric power plants, and more particularly to methods of operating stoichiometric exhaust gas recirculation turbine systems. Various types of gas turbine systems are known and in use for electricity generation in power plants. Typically, the gas turbine systems include a turbine compressor for compressing an air flow and a turbine combustor that combines the compressed air with a fuel and ignites the mixture to generate an exhaust gas. The exhaust gas may then be expanded through a turbine, thereby causing the turbine to rotate, which in turn may be connected to a turbine generator via a turbine shaft, for power generation. Gas turbines have traditionally used excess air within the combustion process to control turbine temperatures and manage undesirable emissions. This often results in an exhaust stream with large amounts of excess oxygen.

Accordingly, there exists a need for a power plant arrangement that uses a gas turbine system that may operate without an exhaust stream with large amounts of excess oxygen. Furthermore, it would be desirable for the power plant arrangement to provide for the option to further reduce emissions through treatment of exhaust gases and/or to recover streams of carbon dioxide, nitrogen, and water.

BRIEF DESCRIPTION OF THE INVENTION

In one aspect, a power plant arrangement is provided. The power plant arrangement includes at least one main air compressor for compressing ambient air into a compressed ambient gas flow and at least one gas turbine assembly. Each gas turbine assembly comprises a turbine combustor, fluidly connected to the at least one main air compressor, for mixing at least a first portion of the compressed ambient gas with at least a first portion of a recirculated low oxygen content gas flow and a fuel stream to form a combustible mixture and for burning the combustible mixture and forming the recirculated low oxygen content gas flow. The gas turbine assembly further comprises a turbine connected to the turbine combustor and to a turbine shaft, and is arranged to be driven by the recirculated low oxygen content gas flow from the turbine combustor. The assembly further comprises a turbine compressor, fluidly connected to the turbine combustor, and connected to the turbine shaft and being arranged to be driven thereby. The assembly also comprises a recirculation loop for recirculating at least a portion of the recirculated low oxygen content gas flow from the turbine to the turbine compressor. Additionally, at least one auxiliary apparatus is fluidly connected to at least a second portion of the compressed ambient gas flow so that the at least a second portion of the compressed ambient gas flow at least partially mechanically powers the at least one auxiliary apparatus.

In another aspect, a method for operating a power plant is provided. The method includes compressing ambient air with at least one main air compressor to form a compressed ambient gas flow, delivering at least a first portion of the compressed ambient gas flow to a turbine combustor of at least one gas turbine assembly, and mixing the compressed ambient gas flow with at least a first portion of a recirculated low oxygen content gas flow and a fuel stream to form a combustible mixture and burning the mixture in a turbine combustor to produce the recirculated low oxygen content gas flow. The method further comprises driving a turbine connected to a turbine shaft using the recirculated low oxygen content gas flow and driving a turbine compressor, fluidly connected to the turbine combustor, via rotation of the turbine shaft. The method also comprises recirculating at least a portion of the recirculated low oxygen content gas flow from the turbine to the turbine compressor using a recirculation loop. The method further includes delivering at least a second portion of the compressed ambient gas flow to at least one auxiliary apparatus fluidly connected to the at least a second portion of the compressed ambient gas flow so that the at least a second portion of compressed ambient gas flow at least partially mechanically powers the at least one auxiliary apparatus.

Additional aspects will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

These and other features, aspects, and advantages of the present invention will become better understood when the following detailed description is read with reference to the accompanying drawings, where the components are not necessarily to scale, and in which corresponding reference numerals designate corresponding parts throughout the drawings, wherein.

DETAILED DESCRIPTION OF THE INVENTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Recent requirements in the power generation industry have necessitated the development of a gas turbine arrangement that may be configured to consume substantially all of the oxygen in the air working fluid to produce an essentially oxygen-free exhaust stream. Such an exhaust stream may be more easily suited to emissions reductions using $NO_x$ catalysts. Additionally, such an exhaust stream may be better suited to post combustion carbon capture solutions due to the low oxygen concentrations. Furthermore, a largely oxygen-free exhaust stream may be more easily suited to enhanced oil recovery applications.

A substantially oxygen-free exhaust from a gas turbine may be accomplished by stoichiometric burning in the combustion system. That is, the oxygen-containing fresh air supply may be matched to the fuel flow such that the combustion process operates at near combustion stoichiometry.

A stoichiometric combustion reaction of methane and oxygen is illustrated below:

Stoichiometric combustion results in gas temperatures that may be too high for the materials and cooling technology employed in gas turbine engines. In order to reduce those high temperatures, a portion of the gas turbine exhaust products may be recirculated back to the combustion system to dilute the combustion temperatures. Ideally, this diluent gas should also be significantly oxygen free so as to not introduce additional oxygen into the system and thereby reduce the advantages of stoichiometric combustion. The gas turbine application using stoichiometric combustion and recirculated exhaust gas is referred to as Stoichiometric Exhaust Gas Recirculation (SEGR).

The SEGR system may use a supply of high pressure air fed directly into the combustion process to provide the oxygen for combustion. This air may be supplied by an auxiliary compressor. In practice, the ability of an auxiliary compressor to provide air at the pressure and flow rate required by the SEGR gas turbine will not be matched across all operating ranges of load and ambient temperature experienced by the system. The auxiliary compressor may allow the compressor to provide more air at times than is required by the gas turbine. Further, the auxiliary compressor may be designed with the capability to always provide more air than is required by the gas turbine. It some situations, it may be necessary to discharge some of the air compressed by the auxiliary compressor to the atmosphere.

As discussed in detail below, embodiments of the present invention may function to minimize emissions in gas turbine power plant systems by using an SEGR cycle that may enable substantially stoichiometric combustion reactions for power production. The SEGR gas turbine may be configured so as to provide a low oxygen content exhaust. This low oxygen content exhaust may be used with an $NO_x$ reduction catalyst to provide an exhaust stream that may also be free of $NO_x$ contaminants.

In some embodiments, a portion of a recirculated low oxygen content gas flow may be extracted from at least one gas turbine assembly and may be separated into a nitrogen portion and a carbon dioxide portion. In some embodiments, the nitrogen portion and the carbon dioxide portion may be compressed by compressors, wherein the compressors may use at least a second portion of a compressed ambient gas flow that may be produced by a main air compressor as a mechanical power source. In some embodiments, the present technique may also include using the SEGR cycle to provide low oxygen content streams of carbon dioxide and nitrogen and may be used in enhanced oil recovery applications.

Power Plant Arrangements

Figure 1:
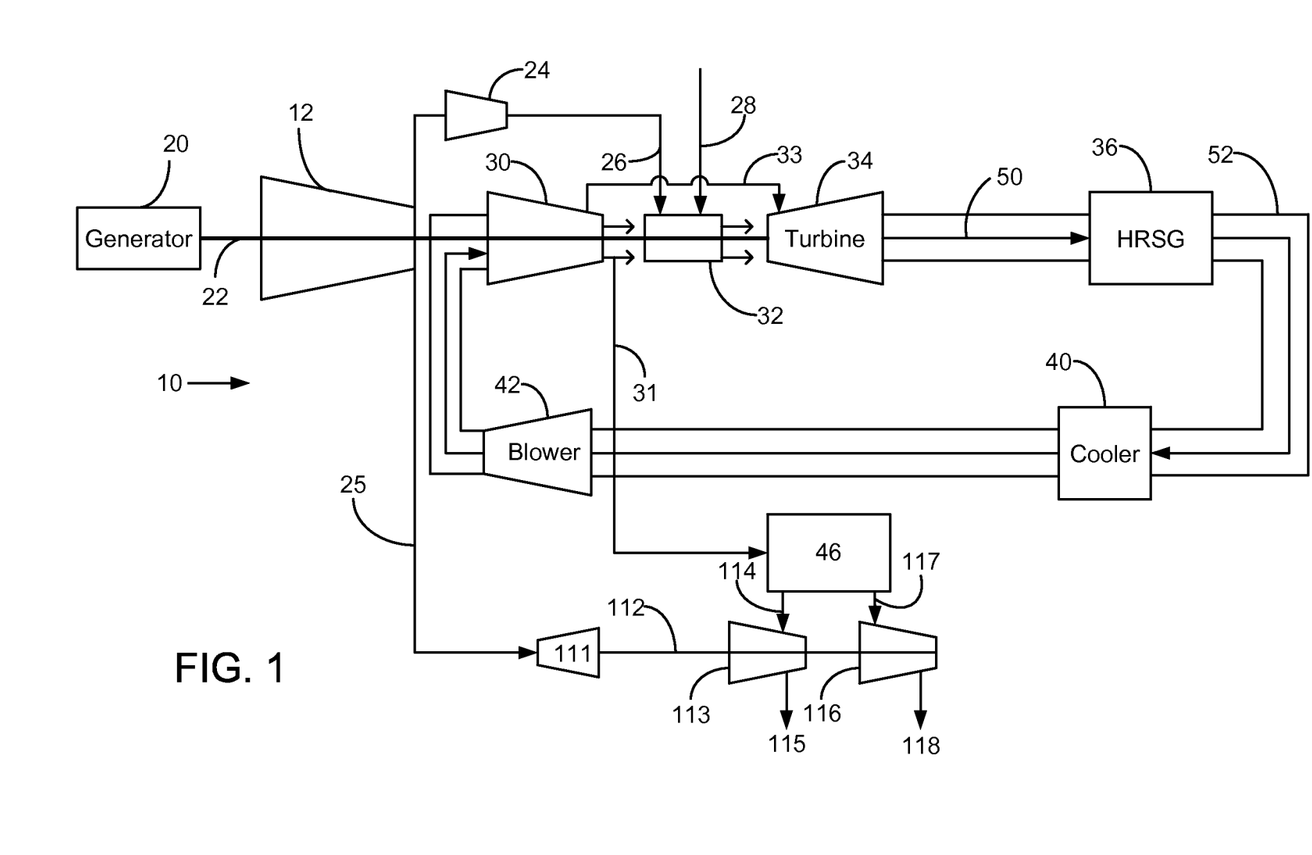
FIG. 1 is a diagrammatical illustration of an exemplary power plant arrangement 10 in accordance with an embodiment of the present invention.

Turning now to the drawings and referring first to FIG. 1 an exemplary power plant arrangement 10 is illustrated. The exemplary power plant arrangement 10 may include a main air compressor 12 for compressing ambient air into at least a first portion of a compressed ambient gas flow 26. Further, the at least one gas turbine assembly of the power plant arrangement 10 may include a turbine combustor 32 that may be fluidly connected to the main air compressor 12. The turbine combustor 32 may be configured to receive the at least a first portion of the compressed ambient gas flow 26 from the main air compressor 12, at least a first portion of a recirculated low oxygen content gas flow 50 from a turbine compressor 30, and a fuel stream 28, to form a combustible mixture and to burn the combustible mixture to generate the recirculated low oxygen content gas flow 50.

In addition, the power plant arrangement 10 may include a turbine 34 located downstream of the turbine combustor 32. The turbine 34 may be configured to expand the recirculated low oxygen content gas flow 50 that may be delivered by the turbine combustor 32 and may be used to drive an external load such as a turbine generator 20 via a turbine shaft 22 to generate electricity. In the illustrated embodiment 10, the main air compressor 12 and the turbine compressor 30 may be driven by the power generated by the turbine 34 via the turbine shaft 22.

As used herein, the term "recirculated low oxygen content gas flow" refers to the gas flow generated by the burning of the combustible mixture in the turbine combustor 32 and flowing through a recirculation loop 52. In some embodiments, the term "low oxygen content" refers to an oxygen content of below about 5 vol %, below about 2 vol %, or below about 1 vol %.

As used herein, the term "gas turbine assembly" refers to all listed components of the power plant arrangements except for the main air compressor 12. In other embodiments comprising multiple main air compressors, the term "gas turbine assembly" refers to all listed components of the power plant arrangements except for the multiple main air compressors.

In some embodiments, the recirculated low oxygen content gas flow 50 may be directed from the turbine combustor 32 through the recirculation loop 52 to a heat recovery steam generator 36 for the generation of steam. A steam turbine may be configured to generate additional electricity using the steam from the heat recovery steam generator 36, and the steam turbine may be connected to a steam generator. In some embodiments, the steam turbine may be arranged to be connected to the turbine shaft 22. The recirculated low oxygen content gas flow 50 may then be directed back into the recirculation loop 52 to a recirculated gas flow cooler 40. In still other embodiments, the recirculation loop 52 may not contain a heat recovery steam generator 36 and the recirculated low oxygen content gas flow 50 may instead be introduced directly into the recirculated gas flow cooler 40 upon exit from the turbine 34. In other embodiments, the recirculation loop 52 may not comprise the recirculated gas flow cooler 40.

The recirculated gas flow cooler 40 may be incorporated into the recirculation loop 52 anywhere downstream from the turbine 34. The recirculated gas flow cooler 40 may be configured to lower the temperature of the recirculated low oxygen content gas flow 50 to a suitable temperature for downstream delivery into the turbine compressor 30 via the recirculation loop 52. In some embodiments, a suitable temperature may be below about 66° C., below about 49° C., or below about 45° C.

In some embodiments, at least one auxiliary apparatus may be fluidly connected to at least a second portion of a compressed ambient gas flow 25 so that the at least a second portion of the compressed ambient gas flow 25 may at least partially mechanically power the at least one auxiliary apparatus. In some embodiments, additional power sources may be used to additionally power the auxiliary apparatus. In some embodiments, at least a second portion of a compressed ambient gas flow 25 may be delivered from the main air compressor 12 to an auxiliary turbine 111, thereby causing the auxiliary turbine 111 to rotate. The auxiliary turbine 111 may be connected to an auxiliary turbine shaft 112, and the auxiliary turbine shaft 112 may be further connected to both the nitrogen compressor 113 and the carbon dioxide compressor 116. In some embodiments, rotation of the auxiliary turbine 111 may be used to drive both the nitrogen compressor 113 and the carbon dioxide compressor 116. In still other embodiments, the at least a second portion of the compressed ambient gas flow 25 may be used to mechanically power other auxiliary apparatus.

In some embodiments, the at least one gas turbine assembly of the power plant arrangement 10 may include a recirculated gas flow extraction path 31 for extracting at least a second portion of the recirculated low oxygen content gas flow 50 from the at least one gas turbine assembly and delivering the at least a second portion of the recirculated low oxygen content gas flow 50 to a gas separation system 46. The gas separation system 46 may be used to separate the at least a second portion of the recirculated low oxygen content gas flow 50 into a nitrogen portion and a carbon dioxide portion. In some embodiments, the nitrogen portion may be delivered as a nitrogen stream 114 from the gas separation system 46 to a nitrogen compressor 113, while the carbon dioxide portion may be delivered as a carbon dioxide stream 117 from the gas separation system 46 to a carbon dioxide compressor 116. The nitrogen compressor 113 may be used to create a compressed nitrogen stream 115 and the carbon dioxide compressor 116 may be used to create a compressed carbon dioxide stream 118.

In some embodiments, the recirculated gas flow extraction path 31 may be in fluid communication with an output of the turbine compressor 30. In other embodiments, the recirculated gas flow extraction path 31 may be attached to any point of the recirculation loop 52.

In some embodiments, the gas turbine assembly may further comprise a secondary flow path 33 that may deliver at least a third portion of the recirculated low oxygen content gas flow 50 from the turbine compressor 30 to the turbine 34 as a secondary flow. The secondary flow may be used to cool and to seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 downstream of the turbine 34.

In some embodiments, a booster compressor 24 may be incorporated downstream of and in fluid connection with the main air compressor 12 and upstream of and in fluid connection with the turbine combustor 32. The booster compressor 24 may further compress the at least a first portion of the compressed ambient gas flow 26 before delivery into the turbine combustor 32.

In still other embodiments, a blower 42 may be fluidly connected to the recirculation loop 52 upstream of or downstream from the recirculated gas flow cooler 40. The blower 42 may be configured to increase the pressure of the recirculated low oxygen content gas flow 50 prior to delivery into the turbine compressor 30 via the recirculation loop 52.

In some embodiments, the main air compressor 12 may further comprise adjustable inlet guide vanes to control the flow of air into the main air compressor 12. Additionally, the turbine compressor 30 may further comprise adjustable inlet guide vanes to control the flow of air into the turbine compressor 30.

In some embodiments, the exemplary power plant arrangement 100 may include a damper door connected to the recirculation loop 52. The damper door may be opened to vent a portion of the recirculated low oxygen gas content flow 50 to the atmosphere.

As illustrated in FIG. 1, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly.

Figure 2:
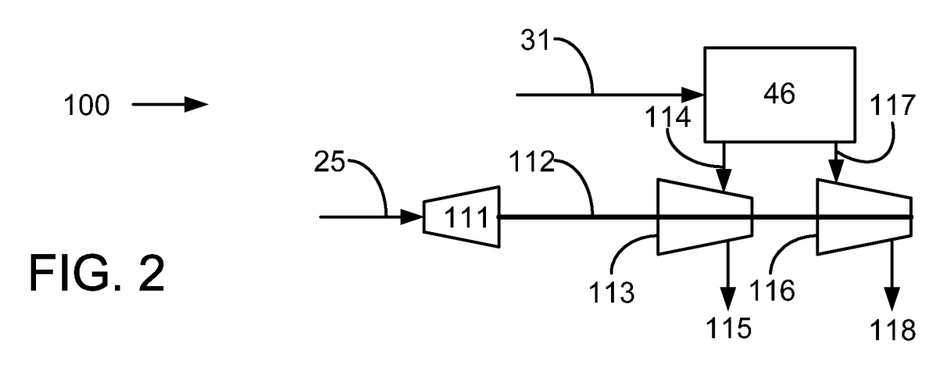
FIG. 2 is a diagrammatical illustration of an exemplary power plant arrangement 100 in accordance with an embodiment of the present invention.

FIG. 2 is a diagrammatical illustration of an exemplary power plant arrangement 100 which focuses on the gas separation system 46. The at least a second portion of the recirculated low oxygen content gas flow 50 may be delivered to the gas separation system 46 via the recirculated gas flow extraction path 31. The gas separation system 46 may be used to separate the at least a second portion of the recirculated low oxygen content gas flow 50 into the nitrogen portion and the carbon dioxide portion. In some embodiments, the nitrogen portion may be delivered as the nitrogen stream 114 from the gas separation system 46 to the nitrogen compressor 113, while the carbon dioxide portion may be delivered as the carbon dioxide stream 117 from the gas separation system 46 to the carbon dioxide compressor 116. The nitrogen compressor 113 may be used to create the compressed nitrogen stream 115 and the carbon dioxide compressor 116 may be used to create the compressed carbon dioxide stream 118.

As shown in FIG. 2, at least a second portion of the compressed ambient gas flow 25 may be delivered to the auxiliary turbine 111, thereby causing the auxiliary turbine 111 to rotate. In other embodiments (not shown), additional power sources may provide power to the auxiliary turbine 111. The auxiliary turbine 111 may be connected to the auxiliary turbine shaft 112, and the auxiliary turbine shaft 112 may be further connected to both the nitrogen compressor 113 and the carbon dioxide compressor 116. In some embodiments, rotation of the auxiliary turbine 111, using the at least a second portion of the compressed ambient gas flow 25, may be used to drive both the nitrogen compressor 113 and the carbon dioxide compressor 116.

As used herein, the term "slave" is synonymous with the terms secondary, auxiliary, or additional. In the following embodiments, the term "slave" refers to the second of two gas turbine assemblies, but can also mean any additional gas turbine assemblies operated with a main gas turbine assembly such as is the second gas turbine assembly in the following embodiments.

Figure 3:
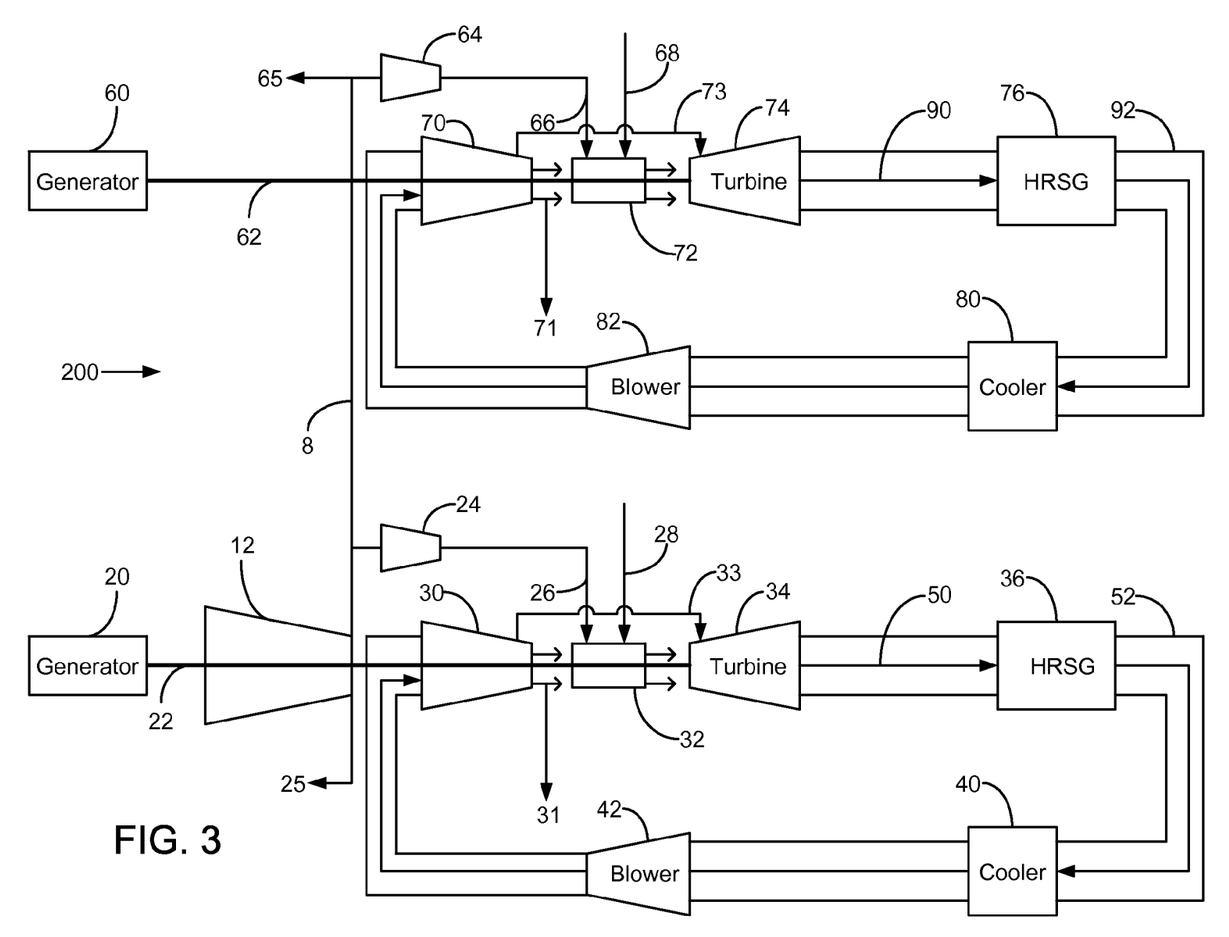
FIG. 3 is a diagrammatical illustration of another exemplary power plant arrangement 200 in accordance with an embodiment of the present invention.

In some embodiments, and as depicted in FIG. 3 as exemplary power plant arrangement 200, the above-described gas turbine assembly may be further connected to a slave gas turbine assembly via an inter-train conduit 8. The main air compressor 12 may compress ambient air into at least a third portion of a compressed ambient gas flow 66 that may be delivered to a slave turbine combustor 72. The slave turbine combustor 72 may be configured to receive the at least a third portion of the compressed ambient gas flow 66 from the main air compressor 12, at least a first portion of a slave recirculated low oxygen content gas flow 90 from a slave turbine compressor 70, and a slave fuel stream 68, to form a slave combustible mixture and to burn the slave combustible mixture to generate the slave recirculated low oxygen content gas flow 90. In addition, a slave turbine 74 may be located downstream of the slave turbine combustor 72. The slave turbine 74 may be configured to expand the slave recirculated low oxygen content gas flow 90 and may be used to drive an external load such as a slave turbine generator 60 via a slave turbine shaft 62 to generate electricity.

As used herein, the term "slave recirculated low oxygen content gas flow" refers to the gas flow generated by the burning of the slave combustible mixture in the slave turbine combustor 72 and flowing through a slave recirculation loop 92. In some embodiments, the term "low oxygen content" refers to an oxygen content of below about 5 vol %, below about 2 vol %, or below about 1 vol %.

In some embodiments, the slave recirculated low oxygen content gas flow 90 may be directed from the slave turbine combustor 72 through the slave recirculation loop 92 to a slave heat recovery steam generator 76 for the generation of steam. A slave steam turbine may be further configured to generate additional electricity using the steam from the slave heat recovery steam generator 76, and the slave steam turbine may be connected to a slave steam generator. In some embodiments, the slave steam turbine may be arranged to be connected to the slave turbine shaft 62. The slave recirculated low oxygen content gas flow 90 may then be directed back into the slave recirculation loop 92 to a slave recirculated gas flow cooler 80. In still other embodiments, the slave recirculation loop 92 may not contain a slave heat recovery steam generator 76 and the slave recirculated low oxygen content gas flow 90 may instead be introduced directly into the slave recirculated gas flow cooler 80 upon exit from the slave turbine 74. In some embodiments, the slave recirculation loop 92 may not comprise the slave recirculated gas flow cooler 80.

The slave recirculated gas flow cooler 80 may be incorporated into the slave recirculation loop 92 anywhere downstream of the slave turbine 74. The slave recirculated gas flow cooler 80 may be configured to lower the temperature of the slave recirculated low oxygen content gas flow 90 to a suitable temperature for downstream delivery into the slave turbine compressor 70 via the slave recirculation loop 92. In some embodiments, a suitable temperature may be below about 66° C., below about 49° C., or below about 45° C.

In some embodiments, a slave booster compressor 64 may be incorporated downstream of and in fluid connection with the main air compressor 12 and upstream of and in fluid connection with the slave turbine combustor 72. The slave booster compressor 64 may further compress the at least a third portion of the compressed ambient gas flow 66 before delivery into the slave turbine combustor 72.

In still other embodiments, a slave blower 82 may be fluidly connected to the slave recirculation loop 92 upstream of or downstream from the slave recirculated gas flow cooler 80. The slave blower 82 may be configured to increase the pressure of the slave recirculated low oxygen content gas flow 90 prior to delivery into the slave turbine compressor 70 via the slave recirculation loop 92.

In an embodiment, the slave turbine compressor 70 may further comprise adjustable inlet guide vanes to control the flow of air into the slave turbine compressor 70.

In some embodiments, the exemplary power plant arrangement 200 may include a slave damper door connected to the slave recirculation loop 92. The slave damper door may be opened to vent a portion of the slave recirculated low oxygen gas content flow 90 to the atmosphere.

As illustrated by FIG. 2, in some embodiments, the turbine shaft 22 may be a "cold-end drive" configuration, meaning the turbine shaft 22 may connect to the turbine generator 20 at the compressor end of the turbine assembly. In other embodiments, the turbine shaft 22 may be a "hot-end drive" configuration, meaning the turbine shaft 22 may connect to the turbine generator 20 at the turbine end of the turbine assembly. Similarly, in some embodiments, the slave turbine shaft 62 may be a "cold-end drive" configuration, meaning the slave turbine shaft 62 may connect to the slave turbine generator 60 at the compressor end of the turbine assembly. In other embodiments, the slave turbine shaft 62 may be a "hot-end drive" configuration, meaning the slave turbine shaft 62 may connect to the slave turbine generator 60 at the turbine end of the turbine assembly.

Figure 4:
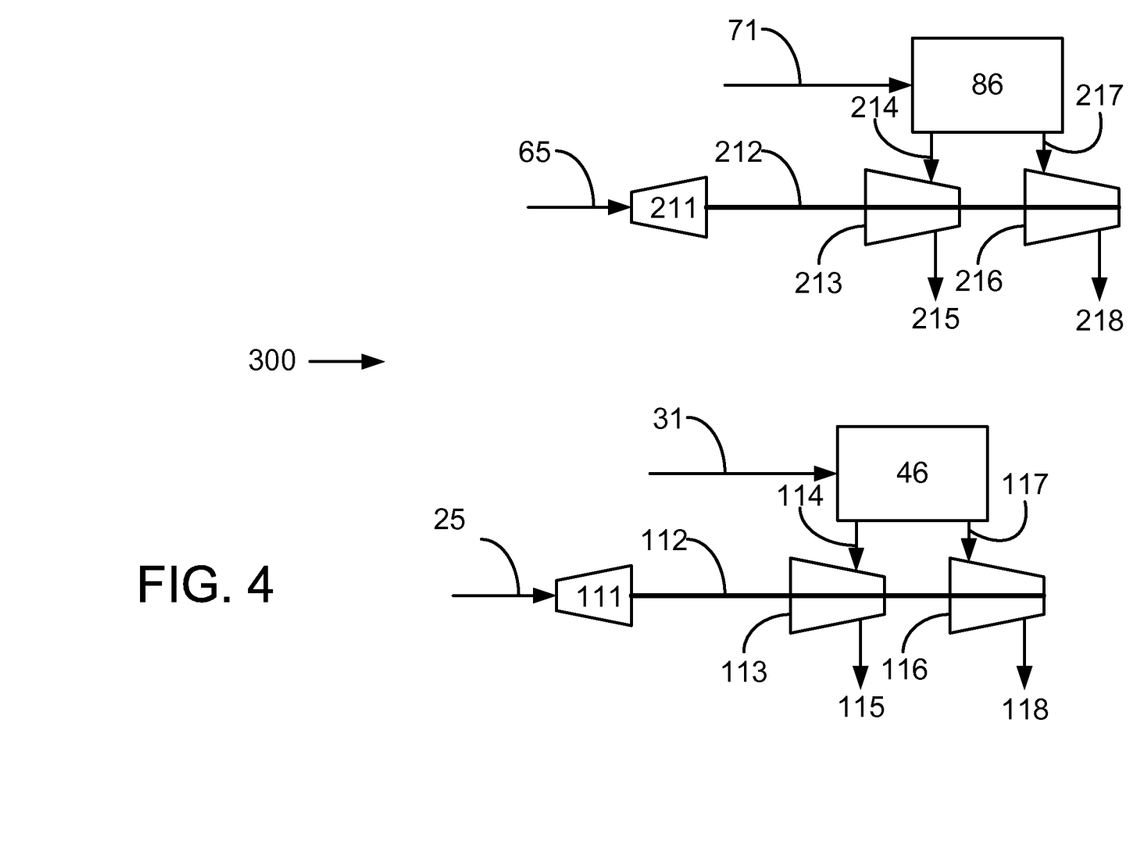
FIG. 4 is a diagrammatical illustration of an exemplary power plant arrangement 300 in accordance with an embodiment of the present invention.

In some embodiments, the slave gas turbine assembly of the plant arrangement 200 may include a slave recirculated gas flow extraction path 71 for extracting at least a second portion of the slave recirculated low oxygen content gas flow 90 from the slave gas turbine assembly. Additionally, at least a fourth portion of the compressed ambient gas flow 65 may be directed from the main air compressor 12. As illustrated in FIG. 4, the slave recirculated gas flow extraction path 71 may deliver the at least a second portion of the slave recirculated low oxygen content gas flow 90 to a slave gas separation system 86. Additionally, the at least a fourth portion of the compressed ambient gas flow 65 may be delivered to a slave auxiliary turbine 211. Returning now to FIG. 3, in some embodiments, the slave recirculated gas flow extraction path 71 may be in fluid communication with an output of the slave turbine compressor 70. In other embodiments, the slave recirculated gas flow extraction path 71 may be attached to any point of the slave recirculation loop 92.

As illustrated by FIG. 4, and in addition to what is illustrated in and described about FIG. 2, the at least a second portion of the slave recirculated low oxygen content gas flow 90 may be delivered to the slave gas separation system 86 via the slave recirculated gas flow extraction path 71. The slave gas separation system 86 may be used to separate the at least a second portion of the slave recirculated low oxygen content gas flow 90 into a slave nitrogen portion and a slave carbon dioxide portion. In some embodiments, the slave nitrogen portion may be delivered as a slave nitrogen stream 214 from the slave gas separation system 86 to a slave nitrogen compressor 213, while the slave carbon dioxide portion may be delivered as a slave carbon dioxide stream 217 from the slave gas separation system 86 to a slave carbon dioxide compressor 216. The slave nitrogen compressor 213 may be used to create a slave compressed nitrogen stream 215 and the slave carbon dioxide compressor 216 may be used to create a slave compressed carbon dioxide stream 218.

As illustrated by FIG. 4, at least a fourth portion of the compressed ambient gas flow 65 may be delivered to the slave auxiliary turbine 211, thereby causing the slave auxiliary turbine 211 to rotate. The slave auxiliary turbine 211 may be connected to a slave auxiliary turbine shaft 212, and the slave auxiliary turbine shaft 212 may be further connected to both the slave nitrogen compressor 213 and the slave carbon dioxide compressor 218. In some embodiments, rotation of the slave auxiliary turbine 211, using the at least a fourth portion of the compressed ambient gas flow 65, may be used to drive both the slave nitrogen compressor 213 and the slave carbon dioxide compressor 216. In other embodiments, the at least a fourth portion of the compressed ambient gas flow 65 may be used to mechanically power other auxiliary apparatus.

Returning now to FIG. 3, in some embodiments, the gas turbine assembly may further comprise a slave secondary flow path 73 that may deliver at least a third portion of the slave recirculated low oxygen content gas flow 90 from the salve turbine compressor 70 to the slave turbine 74 as a slave secondary flow. The slave secondary flow may be used to cool and to seal the slave turbine 74, including individual components of the slave turbine 74 such as the turbine shroud, the turbine nozzle, the turbine blade tip, the turbine bearing support housing, and the like. After cooling and sealing the slave turbine 74 and any individual turbine components, the slave secondary flow may be directed into the slave recirculation loop 92 near the output of the slave turbine 74.

In some embodiments, the power plant arrangement may be configured to deliver compressed nitrogen for enhanced oil recovery when the main air compressor 12 is operated at substantially full speed. In some embodiments, the power plant arrangement may be configured to deliver compressed carbon dioxide for enhanced oil recovery when the main air compressor 12 is operated at substantially full speed. In other embodiments, the power plant arrangement may be configured to deliver both compressed nitrogen and compressed carbon dioxide for enhanced oil recovery when the main air compressor 12 is operated at substantially full speed.

In some embodiments, the power plant arrangement comprises one gas turbine assembly. In other embodiments, the power plant arrangement comprises two or more gas turbine assemblies that are fluidly connected by the inter-train conduit 8. As used herein, the term "inter-train conduit" may refer to a fluid connection between two or more gas turbine assemblies and one or more main air compressors. In still other embodiments, the power plant arrangement comprises three or more gas turbine assemblies and one or more additional main air compressors, wherein the multiple main air compressors and the gas turbine assemblies are in fluid connection with each other. In yet other embodiments, the power plant arrangement is configured for substantially stoichiometric combustion. In another embodiment, the power plant arrangement is configured for substantially zero emissions power production.

In some embodiments, the fuel stream 28 and/or the slave fuel stream 68 may comprise an organic gas, including but not limited to methane, propane, and/or butane. In still other embodiments, the fuel stream 28 and/or the slave fuel stream 68 may comprise an organic liquid, including but not limited to methanol and/or ethanol. In yet other embodiments, the fuel stream 28 and/or the slave fuel stream 68 may comprise a fuel source obtained from a solid carbonaceous material such as coal.

Method of Operation

In an embodiment, a method for operating a power plant arrangement 10 is provided, wherein ambient air may be compressed using a main air compressor 12 to form a compressed ambient gas flow. The compressed ambient gas flow may be delivered to at least one gas turbine assembly. At least a first portion of the compressed ambient gas flow 26 may be delivered to a gas turbine assembly. The at least a first portion of the compressed ambient gas flow 26 may be delivered directly to a turbine combustor 32. The at least a first portion of the compressed ambient gas flow 26 may then be mixed with at least a first portion of a recirculated low oxygen content gas flow 50 and a fuel stream 28 to form a combustible mixture. The combustible mixture may be burned in the turbine combustor 32 to produce the recirculated low oxygen content gas flow 50.

In some embodiments, a turbine 34 may be driven using the recirculated low oxygen content gas flow 50, thereby causing the turbine 34 to rotate. As used herein, the term "driven using the recirculated low oxygen content gas flow" means the recirculated low oxygen content gas flow 50 expands upon exit from the turbine combustor 32 and upon entrance into the turbine 34, thereby causing the turbine 34 to rotate.

In some embodiments, rotation of the turbine 34 may cause the turbine shaft 22 and also the turbine compressor 30 to rotate. The turbine shaft 22 may rotate in the turbine generator 20, such that rotation of the turbine shaft 22 may cause the turbine generator 20 to generate electricity. In some embodiments, the turbine compressor 30 may be fluidly connected to the turbine combustor 32 such that the turbine compressor 30 may compress and deliver the recirculated low oxygen content gas flow 50 to the turbine combustor 32.

In some embodiments, the recirculated low oxygen content gas flow 50 may be recirculated from the output of the turbine 34 to the input of the turbine compressor 30 using the recirculation loop 52. The recirculated low oxygen content gas flow 50 may be cooled to a suitable temperature before delivery to the turbine compressor 30 using the recirculated gas flow cooler 40. The recirculated gas flow cooler 40 may be incorporated into the recirculation loop 52 anywhere downstream from the turbine 34. In some embodiments, a suitable temperature may be below about 66° C., below about 49° C., or below about 45° C.

In some embodiments, the at least a first portion of the compressed ambient gas flow 26 may be further compressed by a turbine booster 24. The turbine booster 24 may be incorporated downstream of and in fluid connection with the main air compressor 12 and upstream of and in fluid connection with the turbine combustor 32.

In still other embodiments, a blower 42 may be fluidly connected to the recirculation loop 52 upstream of or downstream from the recirculated gas flow cooler 40. The blower 42 may be configured to increase the pressure of the recirculated low oxygen content gas flow 50 prior to delivery into the turbine compressor 30 via the recirculation loop 52.

In some embodiments, the main air compressor 12 may further comprise adjustable inlet guide vanes to control the flow of air into the main air compressor 12. Additionally, the turbine compressor 30 may further comprise adjustable inlet guide vanes to control the flow of air into the turbine compressor 30.

In some embodiments, the recirculated low oxygen content gas flow 50 may be directed from the turbine combustor 32 through the recirculation loop 52 to a heat recovery steam generator 36 for the generation of steam. A steam turbine may be configured to generate additional electricity using the steam from the heat recovery steam generator 36, and the steam turbine may be connected to a steam generator. In some embodiments, the steam turbine may be arranged to be connected to the turbine shaft 22. The recirculated low oxygen content gas flow 50 may then be directed back into the recirculation loop 52 to the recirculated gas flow cooler 40. In still other embodiments, the recirculation loop 52 may not contain a heat recovery steam generator 36 and the recirculated low oxygen content gas flow 50 may instead be introduced directly into the recirculated gas flow cooler 40 upon exit from the turbine 34.

In some embodiments, at least a second portion of a compressed ambient gas flow 25 may be delivered to at least one auxiliary apparatus that may be fluidly connected to the at least a second portion of the a compressed ambient gas flow 25 so that the at least a second portion of the compressed ambient gas flow 25 at least partially mechanically powers the at least one auxiliary apparatus. In some embodiments, at least a second portion of a compressed ambient gas flow 25 may be delivered from the main air compressor 12 to an auxiliary turbine 111, thereby causing the auxiliary turbine 111 to rotate. The auxiliary turbine 111 may be connected to an auxiliary turbine shaft 112, and the auxiliary turbine shaft 112 may be further connected to both the nitrogen compressor 113 and the carbon dioxide compressor 116. In some embodiments, rotation of the auxiliary turbine 111 may be used to drive both the nitrogen compressor 113 and the carbon dioxide compressor 116. In still other embodiments, the at least a second portion of the compressed ambient gas flow 25 may be used to at least partially mechanically power other auxiliary apparatus.

In some embodiments, the at least one gas turbine assembly of the power plant arrangement 10 may further comprise a recirculated gas flow extraction path 31 for extracting at least a second portion of the recirculated low oxygen content gas flow 50 from the at least one gas turbine assembly and delivering the at least a second portion of the recirculated low oxygen content gas flow 50 to a gas separation system 46. The gas separation system 46 may be used to separate the at least a second portion of the recirculated low oxygen content gas flow 50 into a nitrogen portion and a carbon dioxide portion. In some embodiments, the nitrogen portion may be delivered as a nitrogen stream 114 from the gas separation system 46 to a nitrogen compressor 113, while the carbon dioxide portion may be delivered as a carbon dioxide stream 117 from the gas separation system 46 to a carbon dioxide compressor 116. The nitrogen compressor 113 may be used to create a compressed nitrogen stream 115 and the carbon dioxide compressor 116 may be used to create a compressed carbon dioxide stream 118.

In some embodiments, the gas turbine assembly may further comprise a secondary flow path 33 that may deliver at least a third portion of the recirculated low oxygen content gas flow 50 from the turbine compressor 30 to the turbine 34 as a secondary flow. The secondary flow may be used to cool and to seal the turbine 34, including individual components of the turbine 34 such as the turbine shroud, the turbine nozzle, the turbine blade tip, the turbine bearing support housing, and the like. After cooling and sealing the turbine 34 and any individual turbine components, the secondary flow may be directed into the recirculation loop 52 near the output of the turbine 34.

In some embodiments, the recirculated gas flow extraction path 31 may be in fluid communication with an output of the turbine compressor 30. In other embodiments, the recirculated gas flow extraction path 31 may be attached to any point of the recirculation loop 52.

In other embodiments, the exemplary power plant arrangement 200 may be operated using a method that generates electricity using substantially stoichiometric combustion. In addition to operating a main gas turbine assembly as described above, in some embodiments, a method for operating the exemplary power plant arrangement 200 is provided, wherein the compressed ambient gas flow further may be delivered to a slave gas turbine assembly. At least a third portion of the compressed ambient gas flow 66 may be delivered to the slave gas turbine assembly. The at least a third portion of the compressed ambient gas flow 66 may be delivered directly to a slave turbine combustor 72. The at least a third portion of the compressed ambient gas flow 66 may then be mixed with at least a first portion of a slave recirculated low oxygen content gas flow 90 and a slave fuel stream 68 to form a slave combustible mixture. The slave combustible mixture may be burned in the slave turbine combustor 72 to produce the slave recirculated low oxygen content gas flow 90.

In some embodiments, a slave turbine 74 may be driven using the slave recirculated low oxygen content gas flow 90, thereby causing the slave turbine 74 to rotate. As used herein, the term "driven using the slave recirculated low oxygen content gas flow" may mean the slave recirculated low oxygen content gas flow 90 expands upon exit from the slave turbine combustor 72 and upon entrance into the slave turbine 74, thereby causing the slave turbine 74 to rotate.

In some embodiments, rotation of the slave turbine 74 may cause the slave turbine shaft 62 and also the slave turbine compressor 70 to rotate. The slave turbine shaft 62 may rotate in the slave turbine generator 60, such that rotation of the slave turbine shaft 62 may cause the slave turbine generator 60 to generate electricity. In some embodiments, the slave turbine compressor 70 may be fluidly connected to the slave turbine combustor 72 such that the slave turbine compressor 70 may compress and deliver the slave recirculated low oxygen content gas flow 90 to the slave turbine combustor 72.

In some embodiments, the slave recirculated low oxygen content gas flow 90 may be recirculated from the output of the slave turbine 74 to the input of the slave turbine compressor 70 using the slave recirculation loop 92. The slave recirculated low oxygen content gas flow 90 may be cooled to a suitable temperature before delivery to the slave turbine compressor 70 using the slave recirculated gas flow cooler 80. The slave recirculated gas flow cooler 80 may be incorporated into the slave recirculation loop 92 anywhere downstream of the slave turbine 74. In some embodiments, a suitable temperature may be below about 66° C., below about 49° C., or below about 45° C. In other embodiments, the slave recirculation loop 92 may not comprise the slave recirculated gas flow cooler 80.

In some embodiments, a slave booster compressor 64 may be incorporated downstream of and in fluid connection with the main air compressor 12 and upstream of and in fluid connection with the slave turbine combustor 72. The slave turbine booster 64 may further compress the at least a third portion of the compressed ambient gas flow 66 before delivery into the slave turbine combustor 72.

In still other embodiments, a slave blower 82 may be fluidly connected to the slave recirculation loop 92 upstream of or downstream from the slave recirculated gas flow cooler 80. The slave blower 82 may be configured to increase the pressure of the slave recirculated low oxygen content gas flow 90 prior to delivery into the slave turbine compressor 70 via the slave recirculation loop 92.

In some embodiments, the slave turbine compressor 70 may further comprise adjustable inlet guide vanes to control the flow of air into the slave turbine compressor 70.

In some embodiments, the slave recirculated low oxygen content gas flow 90 may be directed from the slave turbine combustor 72 through the slave recirculation loop 92 to a slave heat recovery steam generator 76 for the generation of steam. A slave steam turbine may be configured to generate additional electricity using the steam from the slave heat recovery steam generator 76, and the slave steam turbine may be connected to a slave steam generator. In some embodiments, the slave steam turbine may be arranged to be connected to the slave turbine shaft 62. The slave recirculated low oxygen content gas flow 90 may then be directed back into the slave recirculation loop 92 to the slave recirculated gas flow cooler 80. In still other embodiments, the slave recirculation loop 92 may not contain a slave heat recovery steam generator 76 and the slave recirculated low oxygen content gas flow 90 may instead be introduced directly into the slave recirculated gas flow cooler 80 upon exit from the slave turbine 74.

In some embodiments, the slave gas turbine assembly of the exemplary power plant arrangement 200 may include a slave recirculated gas flow extraction path 71 for extracting at least a second portion of the slave recirculated low oxygen content gas flow 90 from the slave gas turbine assembly. Additionally, at least a fourth portion of the compressed ambient gas flow 65 may be directed from the main air compressor 12. As illustrated by FIG. 4, the slave recirculated gas flow extraction path 71 may deliver the at least a second portion of the slave recirculated low oxygen content gas flow 90 to a slave gas separation system 86. Additionally, the at least a fourth portion of the compressed ambient gas flow 65 may be delivered to a slave auxiliary turbine 211. Returning now to FIG. 3, in some embodiments, the slave recirculated gas flow extraction path 71 may be in fluid communication with an output of the slave turbine compressor 70. In other embodiments, the slave recirculated gas flow extraction path 71 may be attached to any point of the slave recirculation loop 92.

As illustrated by FIG. 4, and in addition to what is described by the method embodiments above, the at least a second portion of the slave recirculated low oxygen content gas flow 90 may be delivered to the slave gas separation system 86 via the slave recirculated gas flow extraction path 71. The slave gas separation system 86 may be used to separate the at least a second portion of the slave recirculated low oxygen content gas flow 90 into a slave nitrogen portion and a slave carbon dioxide portion. In embodiments, the slave nitrogen portion may be delivered as a slave nitrogen stream 214 from the slave gas separation system 86 to a slave nitrogen compressor 213, while the slave carbon dioxide portion may be delivered as a slave carbon dioxide stream 217 from the slave gas separation system 86 to a slave carbon dioxide compressor 216. The slave nitrogen compressor 213 may be used to create a slave compressed nitrogen stream 215 and the slave carbon dioxide compressor 216 may be used to create a slave compressed carbon dioxide stream 218.

As illustrated by FIG. 4, at least a fourth portion of the compressed ambient gas flow 65 may be delivered to the slave auxiliary turbine 211, thereby causing the slave auxiliary turbine 211 to rotate. The slave auxiliary turbine 211 may be connected to a slave auxiliary turbine shaft 212, and the slave auxiliary turbine shaft 212 may be further connected to both the slave nitrogen compressor 213 and the slave carbon dioxide compressor 216. In some embodiments, rotation of the slave auxiliary turbine 211, using the at least a fourth portion of the compressed ambient gas flow 65, may be used to drive both the slave nitrogen compressor 213 and the slave carbon dioxide compressor 216. In other embodiments, the at least a fourth portion of the compressed ambient gas flow 65 may be used to mechanically power other auxiliary apparatus.

Returning now to FIG. 3, in some embodiments, the gas turbine assembly may further comprise a slave secondary flow path 73 that may deliver at least a third portion of the slave recirculated low oxygen content gas flow 90 from the slave turbine compressor 70 to the slave turbine 74 as a slave secondary flow. The secondary flow may be used to cool and to seal the slave turbine 74, including individual components of the slave turbine 74 such as the turbine shroud, the turbine nozzle, the turbine blade tip, the turbine bearing support housing, and the like. After cooling and sealing the slave turbine 74 and any individual turbine components, the slave secondary flow may be directed into the slave recirculation loop 92 near the output of the slave turbine 74.

In some embodiments, the power plant arrangement may be configured to deliver compressed nitrogen for enhanced oil recovery when the main air compressor 12 is operated at substantially full speed. In some embodiments, the power plant arrangement may be configured to deliver compressed carbon dioxide for enhanced oil recovery when the main air compressor 12 is operated at substantially full speed. In other embodiments, the power plant arrangement may be configured to deliver both compressed nitrogen and compressed carbon dioxide for enhanced oil recovery when the main air compressor 12 is operated at substantially full speed. In yet other embodiments, the power plant arrangement may be configured to generate electricity using substantially stoichiometric combustion reactions.

In some embodiments, the method comprises operating a power plant arrangement that comprises one gas turbine assembly. In other embodiments, the method comprises operating a power plant arrangement that comprises two or more gas turbine assemblies that are fluidly connected by the intertrain conduit 8. In still other embodiments, the method comprises operating a power plant arrangement that comprises three or more gas turbine assemblies and one or more additional main air compressors, wherein the additional main air compressors are in fluid connection with each other and with the gas turbine assemblies. In yet other embodiments, the method comprises operating a power plant arrangement that is configured for substantially stoichiometric combustion. In still other embodiments, the method comprises operating a power plant arrangement that is configured for substantially zero emissions power production.

Other configurations and methods of operation are provided by U.S. patent applications including "Power Plant and Method of Operation" to Daniel Snook, Lisa Wichmann, Sam Draper, Noemie Dion Ouellet, and Scott Rittenhouse (filed Aug. 25, 2011), "Power Plant and Method of Operation" to Daniel Snook, Lisa Wichmann, Sam Draper, Noemie Dion Ouellet, and Scott Rittenhouse (filed Aug. 25, 2011), "Power Plant Start-Up Method" to Daniel Snook, Lisa Wichmann, Sam Draper, Noemie Dion Ouellet, and Scott Rittenhouse (filed Aug. 25, 2011), "Power Plant and Control Method" to Daniel Snook, Lisa Wichmann, Sam Draper, and Noemie Dion Ouellet (filed Aug. 25, 2011), "Power Plant and Method of Operation" to Predrag Popovic (filed Aug. 25, 2011), "Power Plant and Method of Operation" to Sam Draper (filed Aug. 25, 2011), "Power Plant and Method of Use" to Daniel Snook, Lisa Wichmann, Sam Draper, and Noemie Dion Ouellet (filed Aug. 25, 2011), "Power Plant and Method of Operation" to Sam Draper (filed Aug. 25, 2011), "Power Plant and Method of Operation" to Lisa Wichmann (filed Aug. 25, 2011), and "Power Plant and Control Method" to Karl Dean Minto (filed Aug. 25, 2011), the disclosures of which are incorporated by reference herein.

It should be apparent that the foregoing relates only to the preferred embodiments of the present invention and that numerous changes and modifications may be made herein without departing from the spirit and the scope of the invention as defined by the following claims and equivalents thereof.

We claim:

1. A power plant arrangement, comprising:
at least one main air compressor for compressing ambient air into a compressed ambient gas flow; and
at least one gas turbine assembly, comprising:
a turbine combustor, fluidly connected to the at least one main air compressor, for mixing at least a first portion of the compressed ambient gas flow with at least a first portion of a recirculated low oxygen content gas flow and a fuel stream to form a combustible mixture and for burning the combustible mixture and forming the recirculated low oxygen content gas flow;
a turbine connected to the turbine combustor and to a turbine shaft, and being arranged to be driven by the recirculated low oxygen content gas flow from the turbine combustor;
a turbine compressor, fluidly connected to the turbine combustor, and connected to the turbine shaft and being arranged to be driven thereby;

a recirculation loop for recirculating at least a portion of the recirculated low oxygen content gas flow from the turbine to the turbine compressor;

a recirculated gas flow extraction path for extracting at least a second portion of the recirculated low oxygen content as flow from the at least one as turbine assembly; and a gas separation system for receiving the at least a second portion of the recirculated low oxygen content gas flow from the recirculated gas flow extraction path and separating the at least a second portion of the recirculated low oxygen content gas flow into a nitrogen portion and a carbon dioxide portion;

at least one auxiliary turbine fluidly connected to at least a second portion of the compressed ambient gas flow so that the at least a second portion of the compressed ambient gas flow powers the at least one auxiliary turbine;

wherein the power plant arrangement is further configured for substantially stoichiometric combustion; and wherein the at least a second portion of the compressed ambient gas flow is not delivered to the turbine combustor subsequent to delivery to the at least one auxiliary turbine.

2. The power plant arrangement of claim 1, further comprising:
a nitrogen compressor for receiving the nitrogen portion; and
a carbon dioxide compressor for receiving the carbon dioxide portion;
wherein the nitrogen compressor, the carbon dioxide compressor, or both are powered, via an auxiliary turbine shaft, by the auxiliary turbine.

3. The power plant arrangement of claim 1, wherein the at least one gas turbine assembly further comprises a turbine generator connected to the turbine by the turbine shaft and arranged to be driven thereby.

4. The power plant arrangement of claim 1, wherein the at least one gas turbine assembly further comprises a heat recovery steam generator in the recirculation loop, configured to receive the recirculated low oxygen content gas flow from the turbine for generation of steam and to generate additional electricity using a steam turbine and a steam generator.

5. The power plant arrangement of claim 1, wherein the at least one gas turbine assembly further comprises a blower in the recirculation loop configured to increase the pressure of the recirculated low oxygen content gas flow delivered to the turbine compressor.

6. The power plant arrangement of claim 1, wherein the at least one gas turbine assembly further comprises a booster compressor for further compressing the at least a first portion of the compressed ambient gas flow prior to delivery into the turbine combustor.

7. The power plant arrangement of claim 2, further configured to deliver compressed nitrogen and compressed carbon dioxide for enhanced oil recovery.

8. The power plant arrangement of claim 1, wherein the at least one gas turbine assembly further comprises a secondary flow path that delivers at least a third portion of the recirculated low oxygen content gas flow from the turbine compressor to the turbine as a secondary flow, and the secondary flow is further delivered into the recirculation loop after cooling and sealing the turbine.

9. A method for operating a power plant, comprising:
compressing ambient air with at least one main air compressor to form a compressed ambient gas flow;

delivering at least a first portion of the compressed ambient gas flow to a turbine combustor of at least one gas turbine assembly;

mixing the at least a first portion of the compressed ambient gas flow with at least a first portion of a recirculated low oxygen content gas flow and a fuel stream to form a combustible mixture and burning the mixture in the turbine combustor to produce the recirculated low oxygen content gas flow;

driving a turbine connected to a turbine shaft using the recirculated low oxygen content gas flow;

driving a turbine compressor, fluidly connected to the turbine combustor, via rotation of the turbine shaft;

recirculating at least a portion of the recirculated low oxygen content gas flow from the turbine to the turbine compressor using a recirculation loop;

delivering at least a second portion of the compressed ambient gas flow to at least one auxiliary turbine fluidly connected to the at least a second portion of the compressed ambient gas flow so that the at least a second portion of the compressed ambient gas flow powers the at least one auxiliary turbine;

extracting at least a second portion of the recirculated low oxygen content gas flow from the at least one gas turbine assembly using a recirculated gas flow extraction path;

separating the at least a second portion of the recirculated low oxygen content gas flow into a nitrogen portion and a carbon dioxide portion using a gas separation system; and generating electricity with substantially stoichiometric combustion;

wherein the at least a second portion of the compressed ambient gas flow is not delivered to the turbine combustor subsequent to delivery to the at least one auxiliary turbine.

10. The method of claim 9, further comprising:
receiving the nitrogen portion and compressing the nitrogen portion with a nitrogen compressor; and
receiving the carbon dioxide portion and compressing the carbon dioxide portion with a carbon dioxide compressor;
wherein the at least one auxiliary turbine provides power, via an auxiliary turbine shaft, to the nitrogen compressor, the carbon dioxide compressor, or both.

11. The method of claim 9, wherein a turbine generator is connected to the turbine by the turbine shaft and is arranged to be driven thereby.

12. The method of claim 9, wherein the recirculation loop further comprises a heat recovery steam generator, configured to receive the recirculated low oxygen content gas flow from the turbine for generation of steam and to generate additional electricity using a steam turbine and a steam generator.

13. The method of claim 9, further comprising increasing the pressure of the recirculated low oxygen content gas flow that is delivered to the turbine compressor using a blower in the recirculation loop.

14. The method of claim 9, further comprising compressing the at least a first portion of the compressed ambient gas flow prior to delivery into the turbine combustor using a booster compressor.

15. The method of claim 10, further comprising delivering compressed nitrogen and compressed carbon dioxide for enhanced oil recovery.

16. The method of claim 9, further comprising delivering a secondary flow of at least a third portion of the recirculated low oxygen content gas flow from the turbine compressor to the turbine using a secondary flow path, wherein the secondary flow is further delivered into the recirculation loop after cooling and sealing the turbine.

* * * * *